Patented Aug. 3, 1943

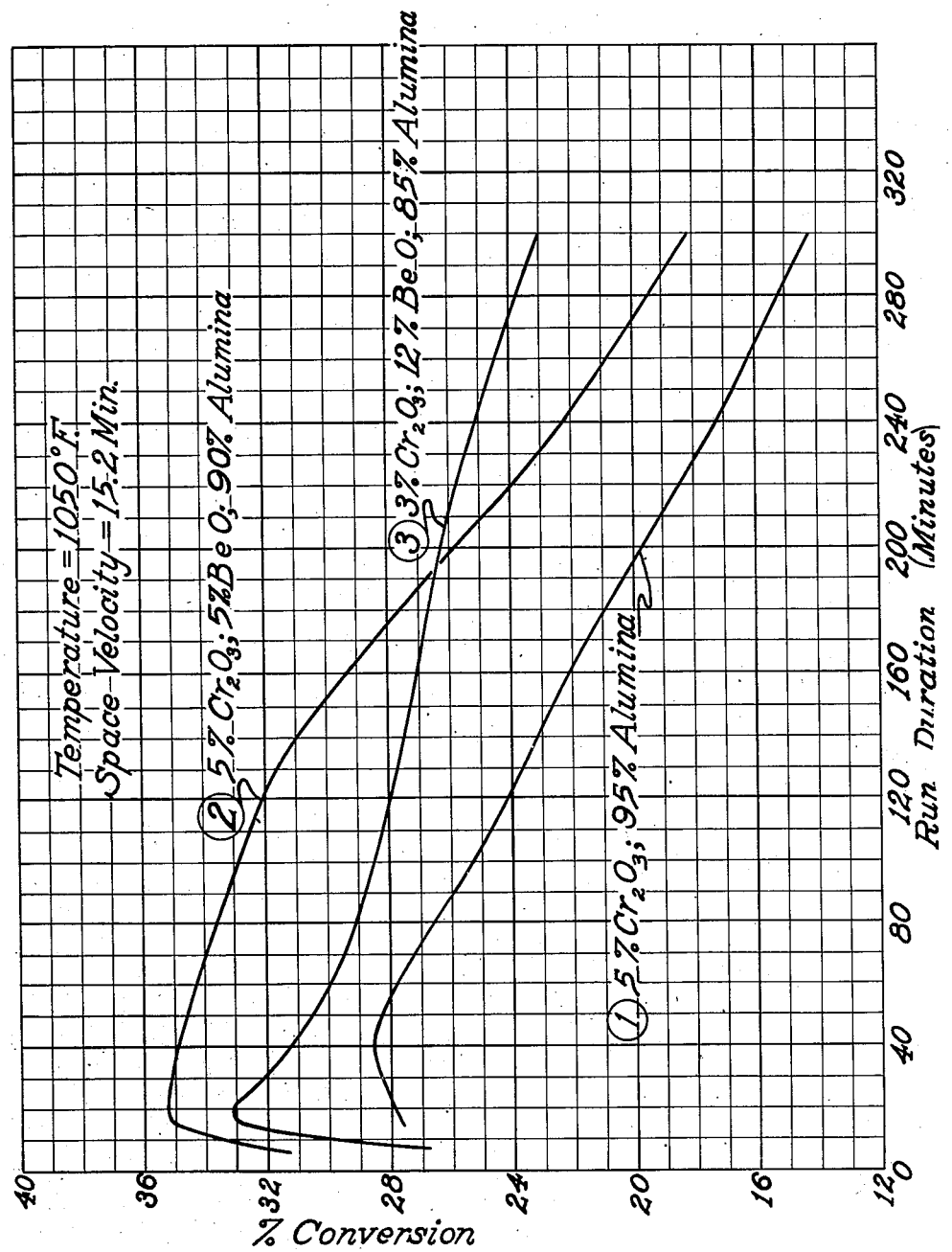

2,325,911

UNITED STATES PATENT OFFICE 2,325,911

CATALYTIC DEHYDROGENATION

Hal C. Huffman, Long Beach, Calif., assignor to Union Oil Company of California, Los Angeles, Calif., a corporation of California Application March 11, 1941, Serial No. 382,735

11 Claims. (Cl. 260—683)

This invention relates to catalysts and catalytic processes for the processing of various hydrocarbons. More particularly, the invention relates to the catalytic dehydrogenation of light or normally gaseous hydrocarbons such as propane, butane, isobutane and the like and of commercial naphthas and stocks boiling within the gasoline range to produce an improved type of motor fuel.

The principal objects of the invention are to provide an efficient catalyst which is comparatively easy to produce, is long lived, is not easily poisoned and at the same time causes an adequately high conversion of the saturated to unsaturated hydrocarbons. A more specific object of the invention is to provide a catalyst composition containing a promoter for the catalytic agent which permits the catalyst to effect a higher degree of dehydrogenation and for a longer period of time. Other and more specific objects of the invention will become apparent as the description thereof proceeds.

The catalytic dehydrogenation of hydrocarbons is a well known process. For this purpose, many catalysts have been employed with varying success. Among these catalysts are the metal oxides, chromates, sulfates, nitrates, chlorides and other suitable salts of chromium, molybdenum, cobalt, nickel, zinc, iron, lead, cadmium, vanadium, manganese, titanium, tantalum, tungsten, platinum, columbium, scandium, thorium, uranium, zirconium, tin, copper, etc. Many of these catalysts are effective when supported on such carriers as alumina, magnesium oxide, silica-alumina mixtures, zirconia, titania, thoria, etc. The oxides of chromium or molybdenum distended on alumina are preferred. For example, a catalyst composed of 5% chromium oxide and 95% alumina is capable of effecting as much as 28–29% conversion of normal butane to butylene at a temperature of 1050° F. at substantially atmospheric pressure and a space velocity of 15 to 17 per minute. My invention relates to an improvement in the above process for dehydrogenating hydrocarbons.

I have discovered that the presence in the catalyst of a small amount of beryllium compound, such as beryllia, not only increases the activity of the foregoing dehydrogenation catalysts to a large extent but maintains the catalytic life of these catalysts at a high level for a considerable longer time than in the case of using the same catalyst in the absence of the beryllium compound. I have found this to be particularly true in the case of chromium or molybdenum oxide distended on alumina. A composition of 1 to 10% chromium oxide, 75 to 98% alumina and 1 to 15% beryllia has been found to be a particularly excellent catalyst for dehydrogenating hydrocarbon gases such as normal butane. The invention may perhaps be best understood by reference to the following examples which are merely illustrative of the invention and are not to be taken as limiting my invention.

The accompanying drawing shows certain curves referred to in the following examples:

Example No. 1

A chromium oxide-alumina catalyst was prepared as follows:

Commercial "activated alumina" (14–20 mesh) was impregnated with a water solution of chromium nitrate so that on drying at 400° F. followed by heating in a current of hydrogen at 950° F. a catalyst composition was produced comprising 5% chromium oxide and 95% alumina. In the above, chromic acid or ammonium dichromate may be used in the place of chromium nitrate.

This catalyst was then used to effect dehydrogenation of normal butane at a temperature of about 1050° F. at pressure of about atmospheric and at a space velocity of about 15.2 per minute.

As shown in curve No. 1, the conversion of normal butane to butylene was about 28% at the 20 minute point. The catalytic activity gradually tapered off until at the end of 300 minutes of operation, the conversion was about 14.5%. The conversion at the 150 minute point was around 22.5%.

Example No. 2

Another catalyst was prepared as follows:

Commercial "activated alumina" was impregnated with a water solution of beryllium nitrate followed by drying first at 400° F. then at 850° F. after which the dried material was treated with a water solution of chromium nitrate and dried as after the first impregnation. Reduction with hydrogen at 950° F. gave a catalyst composition comprising approximately 5% chromium oxide, 5% beryllia, and 90% alumina.

This catalyst was then used to dehydrogenate normal butane at a temperature of about 1050° F. at a space velocity of about 15.2 per minute, or in other words, under substantially the same conditions as in Example No. 1. As shown in curve No. 2, a conversion of about 35% occurs at the 20 minute point which gradually decreased to around 18% at the end of 300 minutes. At the 150 minute point the conversion was 30%.

*Example No. 3*

Another catalyst was prepared as follows:

Commerial "activated alumina" (14-20 mesh) was impregnated with a solution of beryllium nitrate and a solution of chromium nitrate in the manner of Example No. 2 so that on reduction with hydrogen at 950° F. a catalyst composition of 3% chromium oxide, 12% beryllia, and 85% alumina was obtained.

This catalyst was then used to dehydrogenate normal butane under the same conditions as in the above examples. As shown in curve No. 3, a conversion of about 33% was obtained at the 20 minute point and the conversion gradually decreased to 23% at the end of 300 minutes. At the 150 minute point the conversion was around 27.5–28%.

It will be noted from a comparison of curves 2 and 3, that while the catalyst used in Example No. 2 showed a higher initial conversion than that used in Example No. 3, the catalytic activity of the latter is maintained at a higher level to the end of the run. It will be noted also that the presence of beryllia during the reaction materially promotes the activity of the chromium oxide-alumina catalyst to such extent as to result in a conversion at a high level for a long period of time. This effect is definitely beneficial since it permits a greater conversion for the same period of reaction time as compared with the unpromoted catalyst or permits the use of the catalyst for a longer period of time before regeneration is required.

The effect of the beryllia is apparently one of true promotion of the catalyst as distinguished from the use of the substance as a catalyst per se. Beryllia when used alone as a catalyst under the foregoing described conditions of operation showed no ability to catalyze the dehydrogenation of normal butane. A catalyst consisting of 10% beryllia and 90% alumina also showed no catalytic activity to dehydrogenate normal butane.

While the conversion has been illustrated using chromium oxide-alumina as the catalyst and beryllia as the promoter, it is within the spirit of my invention to use beryllia for the promotion of other dehydrogenation catalysts such as mentioned above. I prefer, however, to use those catalysts which have been distended on such supports as alumina, magnesium oxide, activated carbon and the like. Also, instead of using beryllia as the promoter, other beryllium compounds such as the sulfate or the nitrate may be used to promote the catalyzing effect of the dehydrogenation catalysts. Also, instead of using the catalyst for dehydrogenating normal butane, the catalyst may be used for dehydrogenating other normally gaseous hydrocarbons such as propane. In those cases where the catalysts are also useful for reforming gasoline in order to improve the knock rating of the gasoline, the presence of the beryllium compound will have beneficial effect upon the catalyzing effect of the catalysts employed in these operations. In other words, the term "dehydrogenation" as used herein is intended to include the dehydrogenation of not only normaly gaseous hydrocarbons but also the dehydrogenation of normally liquid hydrocarbons such as reforming of gasoline.

In the foregoing description and example, all given percentages are by weight. The foregoing description of my invention is not to be considered as limiting since many variations may be made by those skilled in the art without departing from the scope of the claims or the spirit thereof.

I claim:

1. A process for dehydrogenating hydrocarbons which comprises subjecting hydrocarbons to be dehydrogenated to a temperature of about 1050° F. in the presence of a catalyst consisting of a major proportion of "activated alumina" of commerce and minor proportions of beryllia and an oxide of a metal selected from the left hand column of the sixth group of the periodic table, said catalyst being prepared by adsorbing on "activated alumina" of commerce, aqueous solutions of beryllium salts and salts of metals selected from the left hand column of the sixth group of the periodic table, followed by reducing the salts to the corresponding oxides.

2. A process according to claim 1, in which the oxide of the metal selected from the left hand column of the sixth group of the periodic table is chromium oxide.

3. A process according to claim 1, in which the oxide of the metal selected from the left hand column of the sixth group of the periodic table is molybdenum oxide.

4. A process for dehydrogenating hydrocarbons which comprises subjecting hydrocarbons to be dehydrogenated to a temperature of about 1050° F. in the presence of a catalyst consisting of approximately 1 to 10% of an oxide of a metal selected from the left hand column of the sixth group of the periodic table, 1 to 15% beryllia and the remainder "activated alumina" of commerce, said catalyst being prepared by adsorbing on "activated alumina" of commerce, aqueous solutions of beryllium salts and salts of metals selected from the left hand column of the sixth group of the periodic table, followed by reducing the salts to the corresponding oxides.

5. A process according to claim 4, in which the oxide of the metal selected from the left hand column of the sixth group of the periodic table is chromium oxide.

6. A process according to claim 4, in which the oxide of the metal selected from the left hand column of the sixth group of the periodic table is molybdenum oxide.

7. A process for dehydrogenating hydrocarbons which comprises subjecting hydrocarbons to be dehydrogenated to a temperature of about 1050° F. in the presence of a catalyst consisting of approximately 5% of an oxide of a metal selected from the left hand column of the sixth group of the periodic table, 5% beryllia and the remainder "activated alumina" of commerce, said catalyst being prepared by adsorbing on "activated alumina" of commerce, aqueous solutions of beryllium salts and salts of metals selected from the left hand column of the sixth group of the periodic table, followed by reducing the salts to the corresponding oxides.

8. A process for dehydrogenating hydrocarbons which comprises subjecting hydrocarbons to be dehydrogenated to a temperature of about 1050° F. in the presence of a catalyst consisting of approximately 5% chromium oxide, 5% beryllia and the remainder "activated alumina" of commerce, said catalyst being prepared by adsorbing on "activated alumina" of commerce, aqueous solutions of beryllium and chromium salts, followed by reducing the salts to the corresponding oxides.

9. A process according to claim 8, in which the hydrocarbons to be dehydrogenated comprise normally gaseous paraffin hydrocarbons.

10. A process according to claim 8, in which the hydrocarbons to be dehydrogenated comprise butane.

11. A process for dehydrogenating hydrocarbons which comprises subjecting hydrocarbons to be dehydrogenated to a temperature of about 1050° F. in the presence of a catalyst consisting of approximately 3% chromium oxide, 12% beryllia and the remainder "activated alumina" of commerce, said catalyst being prepared by adsorbing on "activated alumina" of commerce, aqueous solutions of beryllium and chromium salts, followed by reducing the salts to the corresponding oxides.

HAL C. HUFFMAN.